United States Patent
Harms et al.

(10) Patent No.: US 6,831,940 B2
(45) Date of Patent: *Dec. 14, 2004

(54) SYSTEM AND METHOD FOR NARROWING THE RANGE OF FREQUENCY UNCERTAINTY OF A DOPPLER SHIFTED SIGNAL

(75) Inventors: Brian Harms, Superior, CO (US); Sherman A. Gregory, San Diego, CA (US); Brian K. Butler, La Jolla, CA (US); Avneesh Agrawal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 09/885,755

(22) Filed: Jun. 19, 2001

(65) Prior Publication Data

US 2001/0043641 A1 Nov. 22, 2001

Related U.S. Application Data

(63) Continuation of application No. 09/097,842, filed on Jun. 15, 1998, now Pat. No. 6,249,539.

(51) Int. Cl.[7] .............................................. H04B 15/00
(52) U.S. Cl. ....................................... 375/130; 375/134
(58) Field of Search ................................. 375/130, 134, 375/136, 137, 142, 149

(56) References Cited

U.S. PATENT DOCUMENTS 6,249,539 B1 * 6/2001 Harms et al. ................ 375/130

* cited by examiner

Primary Examiner—Stephen Chin
Assistant Examiner—Lawrence Williams
(74) Attorney, Agent, or Firm—Philip R. Wadsworth; Gregory D. Ogrod

(57) ABSTRACT

A system and method for narrowing the range of frequency uncertainty of a Doppler shifted pilot signal in a satellite or other communications system with relative signal source and receiver motion. The satellite communications system includes a user terminal (for example, a mobile wireless telephone), a gateway (terrestrial base station), and at least one satellite with unknown position and unknown relative velocity. The method includes the steps of shifting the pilot signal over a plurality of frequency hypotheses, coherently accumulating samples of the pilot signal over a plurality of chips, measuring the energy of the accumulated pilot signal samples, accumulating the energy measurements over a plurality of chips to produce an energy accumulation value, and determining which of the plurality of frequency hypotheses results in the highest energy accumulation value.

19 Claims, 11 Drawing Sheets

SYSTEM AND METHOD FOR NARROWING THE RANGE OF FREQUENCY UNCERTAINTY OF A DOPPLER SHIFTED SIGNAL

CROSS REFERENCE

This application is a continuation of U.S. application Ser. No. 09/097,842, now U.S. Pat. No. 6,249,539, filed on Jun. 15, 1998, and is incorporated herein by reference.

BACKGROUND OF THE INVENTION

I. Field of the Invention

The present invention relates generally to wireless communication systems, and more specifically, to a system for narrowing the range of frequency uncertainty of a detected pilot signal with an unknown, but bounded amount of Doppler shift.

II. Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled "Spread Spectrum Multiple Access Communication System Using Satellite Or Terrestrial Repeaters," and U.S. Pat. No. 5,691,974, which issued Nov. 25, 1997, entitled "Method And Apparatus For Using Full Spectrum Transmitted Power In A Spread Spectrum Communication System For Tracking Individual Recipient Phase Time And Energy," both of which are assigned to the assignee of the present invention, and incorporated herein by reference.

These patents disclose communication systems in which a large number of generally mobile or remote system users or subscriber units ("user terminals") employ at least one transceiver to communicate with other user terminals, or users of other connected systems, such as a public telephone switching network. Communication signals are transferred either through satellite repeaters and gateways, or directly to terrestrial base stations (also sometimes referred to as cell-sites or cells).

In a modern satellite communications system, timing is critical. For example, such systems typically divide communications channels into "frames" where each frame is of a known duration. In order to optimize the use of such frames in transferring signals or data, the gateways or base stations and the user terminals must employ some method to ensure synchronization. Therefore, each user terminal is supplied with a device for providing a timing reference. An ideal time reference would supply the user terminal with a signal of a known frequency.

A local oscillator is often used to provide a timing reference in the user terminal. However, no local oscillator is perfect. Local oscillators are subject to frequency drift. When the frequency of the local oscillator drifts, synchronization is lost.

One approach to minimizing local oscillator frequency drift is to fabricate a more accurate local oscillator. However, such very stable local oscillators are very expensive to fabricate, and could unacceptably increase the cost of the user terminal.

Another approach, commonly used in cellular telephone systems, involves the use of a voltage controlled temperature compensated crystal oscillator (VTCXO). The output frequency of a VTCXO can be controlled by varying an input voltage to the VTCXO. The VTCXO is highly resistant to frequency drift caused by temperature changes.

In such a cellular telephone system, each user terminal is supplied with a VTCXO. Each user terminal monitors a pilot signal transmitted by a base station. The user terminal uses the frequency of the pilot signal as a timing reference to adjust the output frequency of the VTCXO by varying the input voltage applied to it. Such an approach can be used in a cellular telephone system because the relative velocities between the base stations and the user terminals are small.

However, in some satellite communication systems, such as low-earth orbit (LEO) satellite communication systems, the relative radial velocities between a satellite and a user terminal can be very large. This large relative radial velocity imposes a large Doppler shift on the pilot signal transmitted by the LEO satellite, rendering this technique inaccurate and potentially unusable as a timing reference. When the satellite transmits a signal at frequency $f_t$, the received signal frequency $f_r$ will be:

$$f_r = f_t \pm f_D \quad (1)$$

$$f_D = f_t [V/c] \quad (2)$$

where:
V=Velocity of transmitter relative to receiver;
c=speed of light in the appropriate medium; and
$f_D$=Doppler frequency shift.

If the satellite is moving toward the user terminal, the period of the electromagnetic wave is compressed and the [+] sign is used in the above equation. If the satellite is moving away from the user terminal, then the electromagnetic wave is elongated, and the [−] is used. The Doppler effect can be expressed as a Doppler ratio of [V/c] where V is the velocity of the transmitter relative to the receiver, and c is the speed of light in the appropriate medium. The magnitude of Doppler frequency shift is the Doppler ratio multiplied by $f_t$.

Doppler shifts are particularly acute in a LEO satellite system. For example, a typical LEO satellite can have a velocity of 7 km/sec relative to a user terminal. With a transmitter frequency of 2.5 GHz, this results in a Doppler ratio of 23 parts per million (or 23 ppm), and a Doppler frequency shift of 58 kHz (as calculated from equation 2 below).

Code Doppler error occurs whenever Doppler frequency shift is present and a digital data stream is being transmitted. Code Doppler error occurs because the transmitter is moving toward or away from the receiver causing the receiver bit rate to be increased or decreased relative to the transmitter bit rate. Code Doppler error is the Doppler ratio [V/c] times the transmitter bit rate. The resulting bit rate at the receiver is transmitter bit rate plus/minus code Doppler error where the [+] sign is used when the transmitter is moving toward the receiver, and the [−] sign is used when the transmitter is moving away from the receiver. This relationship is shown by:

$$r_r = r_t + r_D \quad (3)$$

$$r_D = r_t [V/c] \quad (4)$$

where
$r_r$ is the receiver bit rate,
$r_t$ is the transmitter bit rate, and
$r_D$ is the code Doppler error, and V and c are the same as in Equation 1 above.

Code Doppler error is especially harmful in a spread spectrum communications system because of its cumulative effect on pseudonoise (PN) generator synchronization. In a typical spread spectrum communications system, a set of preselected pseudonoise (PN) code sequences is used to modulate (i.e. "spread") the digital message over a predetermined spectral band prior to modulation of the carrier signal. For a spread spectrum receiver to properly "despread" the signal, the local PN generator chipping or chip rate (the rate at which chips are generated) must be time synchronized with the received signal chip rate. ["Chip" is a term of art that refers to a single PN code bit. Digital messages (voice, data, etc.) that have been spread with PN code chips are also sometimes referred to as comprising "chips," although "symbols" is preferred.] If the received signal chip rate is only a fraction of a Hz off, the clock error will accumulate over time causing the PN sequence to loose synchronization with the incoming bit stream. For example, a 0.1 Hz offset between the incoming chip rate and the local PN-generator results in a 0.1 chip per second timing error, which accumulates to 6 chips of timing error in 1 minute. That is, the received signal is shifted in time by 6 chips from where it should be in order for it to be properly despread by the appropriate PN-sequence. Spread spectrum receivers generally require code phase drift to be less than one-half of a chip period to properly despread a signal. Greater than one chip of error produces useless information. Thus, it is important for code Doppler error to be monitored and corrected in spread spectrum receivers.

SUMMARY OF THE INVENTION

The present invention is directed toward a system and method of narrowing the range of frequency uncertainty of a detected pilot signal in a satellite communications system, where the pilot signal has an unknown, but bounded amount of Doppler shift. During detection of the pilot signal, information is gained to place the pilot signal within a frequency bin bounded by a lower and upper frequency. The invention shifts the detected pilot signal by a plurality of frequency hypotheses within the frequency bin, and then determines which hypothesis has the largest energy accumulation value. The hypothesis with the largest energy accumulation value is the closest hypothesis to the true center frequency of the pilot signal. Generally, the level of frequency discrimination that results is limited only by the number of frequency hypotheses tested between the lower and upper frequencies. However, when the pilot signal is a spread spectrum signal, there is tradeoff between the number of hypotheses tested and the accuracy of the energy accumulation value. In essence, code Doppler error causes a loss of time synchronization between the spread spectrum pilot signal and pseudonoise (PN) code sequence used to despread the pilot signal. The timing error increases with processing time (or number of hypotheses tested), and if uncorrected will lead to erroneous energy accumulation values for the latter frequency hypotheses.

The invention incorporates two refinements for correcting code Doppler timing error. First, the code Doppler error is estimated based on the final frequency of the frequency bin that is known to contain the detected pilot signal. The invention monitors the accumulation of the timing error over the plurality of frequency hypotheses and corrects the loss of synchronization before the timing error reaches a level that threatens accurate despreading of the pilot signal. The correction is done by advancing or retarding the timing or chip rate of the PN sequence generation relative to its nominal rate.

The code Doppler error calculation is only an estimate since it is based on the assumption that the pilot signal is located at the upper frequency of the frequency bin. In reality, the pilot signal could be anywhere within the frequency bin. Thus, the above correction does not assure the necessary amount of synchronization needed to accurately despread the pilot signal over the plurality of frequency hypotheses. To further reduce the code Doppler error effect, the invention despreads two sets of the detected pilot signal in parallel during each frequency hypothesis. One pilot signal set is labeled "On-Time", and one pilot signal set is labeled "Late", where the Late set is sampled one-half of a chip period later in time relative to the On-Time sample set. By despreading two sets of pilot signal samples in parallel, where one set is shifted in time relative to the other, the invention achieves an overall reduction in synchronization timing error over the plurality of frequency hypotheses compared to that achieved when only one sample set is processed. This results because the Late sample set achieves minimum timing error at those hypotheses in the center of the pilot signal frequency bin, while the On-Time sample set achieves its minimum timing error for those hypotheses near the edges of the frequency bin.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The present invention is particularly suited for use in communications systems employing low earth orbit (LEO) satellites. However, as would be apparent to one skilled in the relevant art, the concept of the present invention can also be applied to satellite systems that are not utilized for communications purposes. The invention is also applicable to satellite systems in which the satellites travel in non-LEO orbits, or to non-satellite based systems.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for telephone service.

II. A Typical Satellite Communications System

Figure 1:
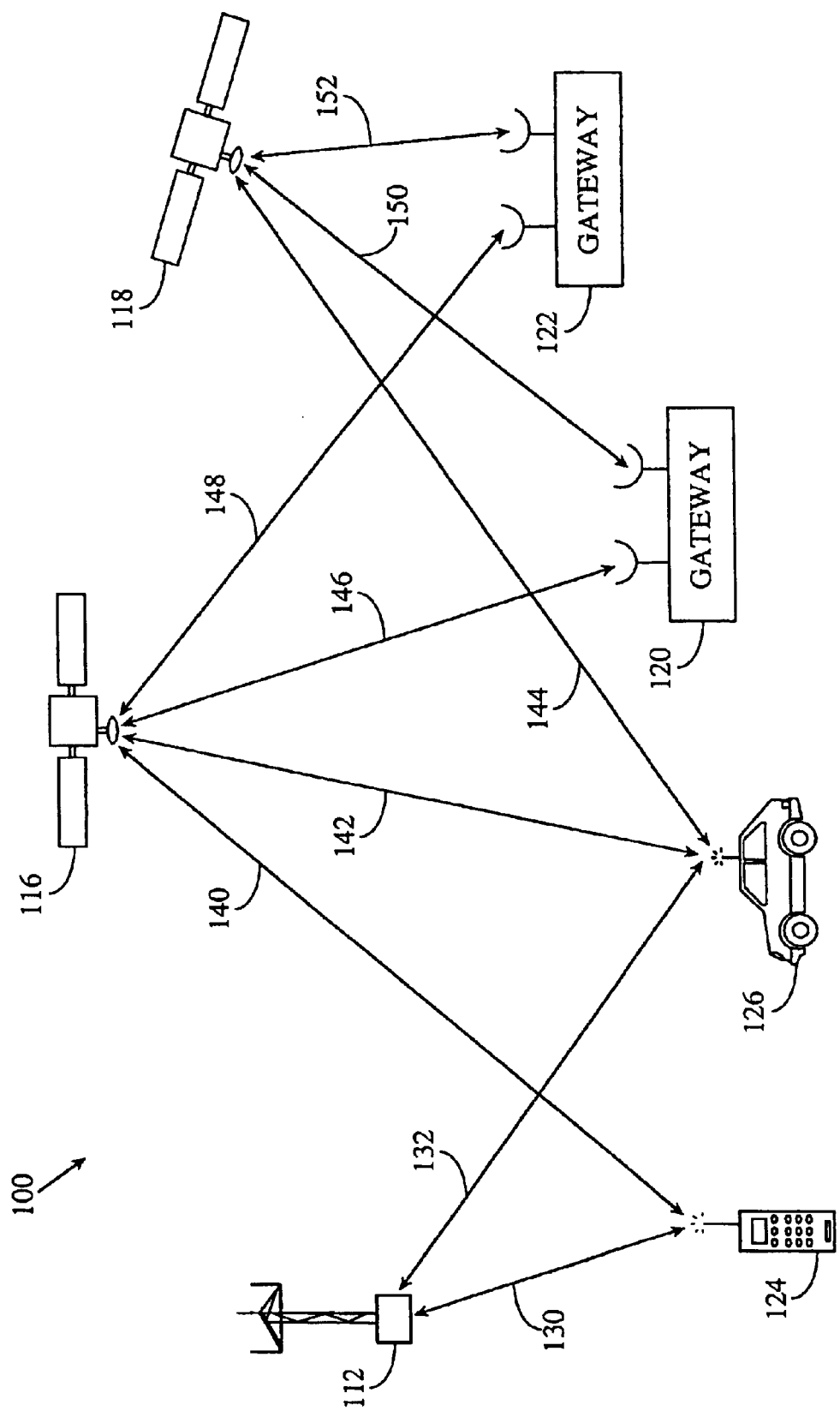
FIG. 1 illustrates an exemplary wireless communication system in which the present invention is useful.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depend on desired system capacity and other factors well understood in the art.

User terminals 124 and 126 each include a wireless communication device such as, but not limited to, a cellular telephone, a data transceiver, or a paging or position determination receiver, and can be hand-held or vehicle-mounted as desired. Here, the user terminals are illustrated as hand-held and vehicle-mounted telephones 124 and 126, respectively. However, it is also understood that the teachings of the invention are applicable to fixed units or units with fixed locations where remote wireless service is desired, including "indoor" as well as "open air" locations.

Generally, beams from satellites 116 and 118 cover different geographical areas in predefined patterns. Beams at different frequencies, also referred to as CDMA channels or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations. At the same time, the invention is equally applicable to terrestrial-based systems of various base station configurations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or data to user terminals 124 and 126.

Figure 2:
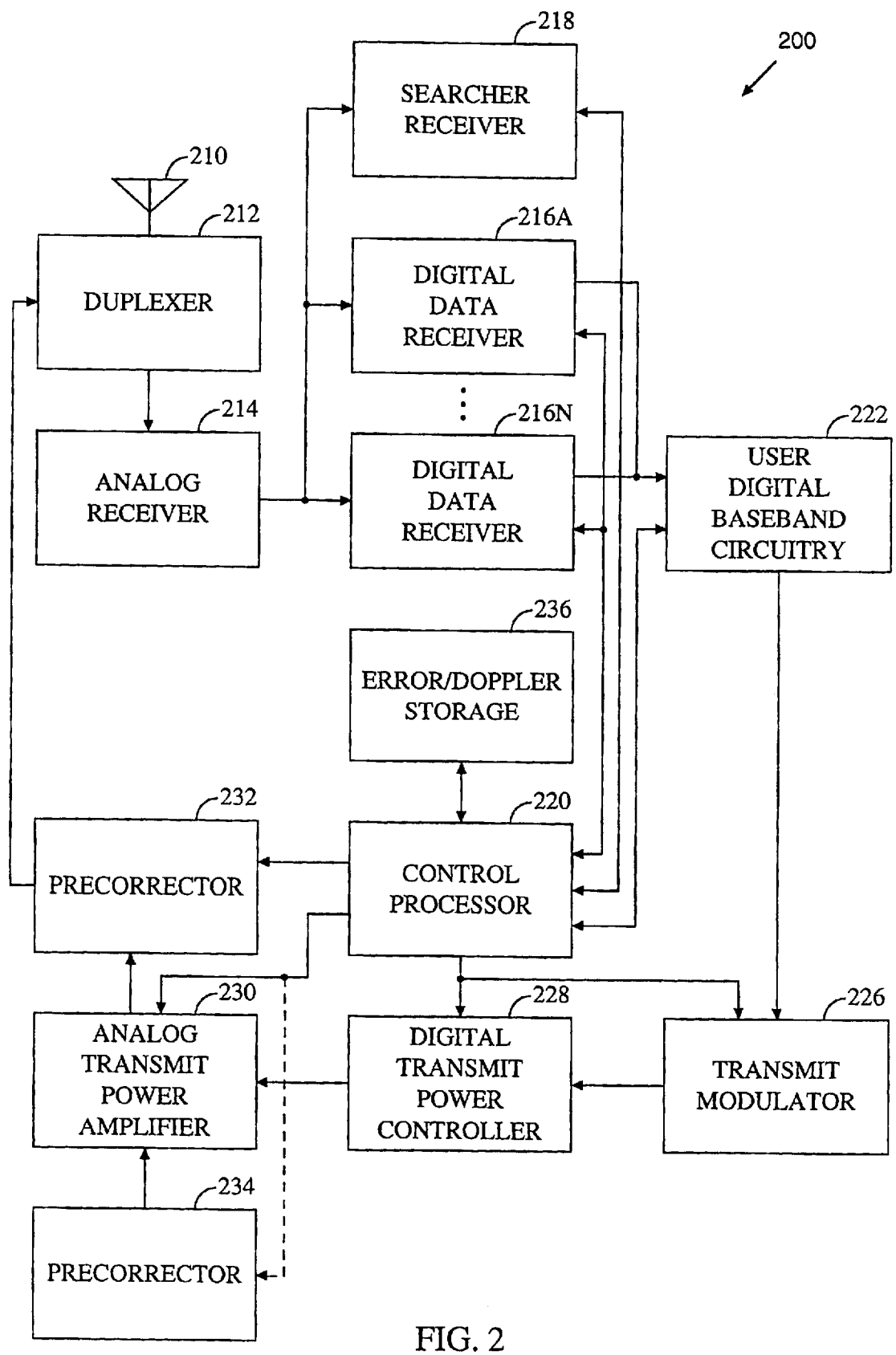
FIG. 2 illustrates an exemplary transceiver for use in a user terminal.

An exemplary transceiver 200 for use in a user terminal 106 is illustrated in FIG. 2. Transceiver 200 uses at least one antenna 210 for receiving communication signals, which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of unit complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230. Transmit power amplifier 230 upconverts and amplifies the baseband signal for final transmission from antenna 210.

User terminal 200 can employ precorrection element 234 in the transmission path to adjust the frequency of the outgoing signal. This can be done by using well known techniques of up- or down-conversion of the transmission waveform. In the alternative, precorrection element 232 can form part of a frequency selection or control mechanism for the analog up-conversion and modulation stage preformed within the transmit power amplifier 230.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220.

Digital receivers 216A–N are configured with signal correlation elements to demodulate and track specific signals. Searcher receiver 218 is used to search for pilot signals, or other relatively fixed pattern strong signals, while data receivers 216A–N are used to demodulate other signals associated with detected pilot signals. For purposes of determining signal strength, however, a data receiver 216 can be assigned to track the pilot signal after acquisition to accurately determine the ratio of signal chip energies to signal noise. Therefore, the outputs of these units can be monitored to determine the energy in or frequency of the pilot signal or other signals. Receivers 216 also employ frequency tracking elements that can be monitored to provide current frequency and timing information, to control processor 220 for signals being demodulated.

The pilot channel is simply a signal that is not modulated by data, and may use a repetitive unchanging pattern or non-varying frame structure type input (pattern). That is, the orthogonal function, here a Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from the PN code generator. In addition, a pilot signal is non-power controlled. That is, the pilot signal is typically transmitted at a preselected fixed power level, which is not varied so that accurate measurements of signal power are achieved by user terminals.

Control processor 220 uses such information to determine to what extent the received signals are offset from the oscillator frequency when scaled to the same frequency band, as appropriate. This and other information related to frequency errors and Doppler shifts, as discussed below, can be stored in a storage or memory element 236, as desired.

III. Detailed Invention Description

Figure 3:
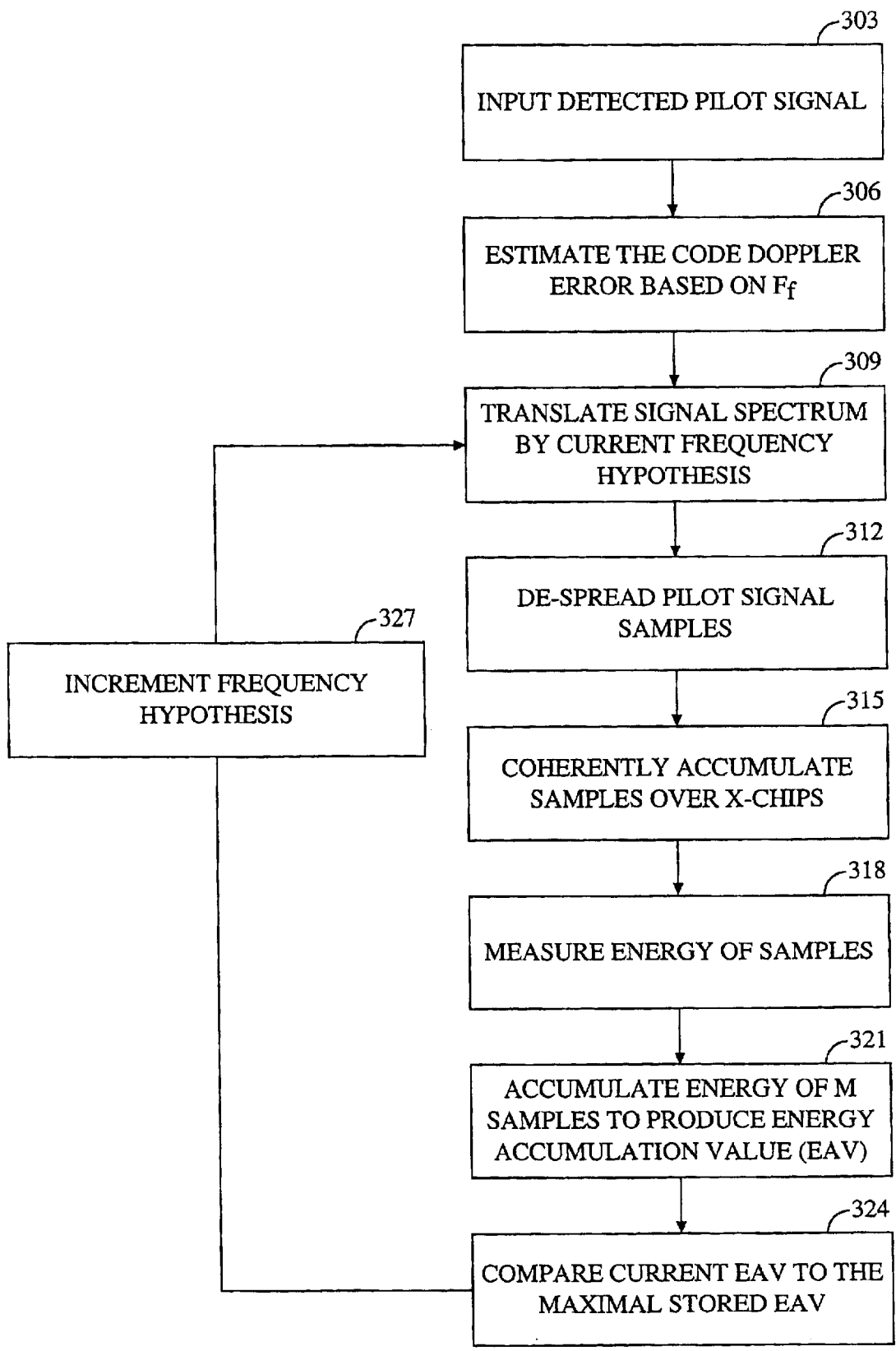
FIG. 3 is a flowchart depicting the operation of the present invention in narrowing the range of frequency uncertainty of a detected pilot signal according to a preferred embodiment of the invention.

FIG. 3 is an operational flow diagram illustrating the operation of the present invention in performing a fine frequency search. The invention will be described in the environment of a spread spectrum satellite cellular communications system, where the satellites are in low earth orbit(LEO) and have large radial velocities relative to the user terminals. However, those skilled in the art will recognize how this approach can also be applied to signals transferred by base stations without using satellites. That is, where there is sufficient signal source/receiver motion to generate Doppler frequency shifts of concern. For example, when using other types of moving repeaters or a fast moving vehicle such as a high speed train.

In a step 303, a detected spread spectrum pilot signal is submitted for processing by searcher receiver 218. The pilot signal is down-converted from the received RF band by analog receiver 214 to baseband where it is A/D converted. If the incoming signal frequency matches the receiver center frequency, then the signal carrier frequency is converted to DC at baseband. This is referred to as being centered around DC. However, the Doppler frequency shift inherent to low earth orbit(LEO) satellite communications (or a source/user terminal configuration with rapidly changing separation distances) shifts the incoming signal out of the receiver center band. The frequency spectrum of the resulting baseband signal is not centered at or about DC (0 Hz) because of the Doppler frequency shift, but has a positive or negative frequency shift. As always, code Doppler error accompanies the Doppler frequency shift.

Figure 4:
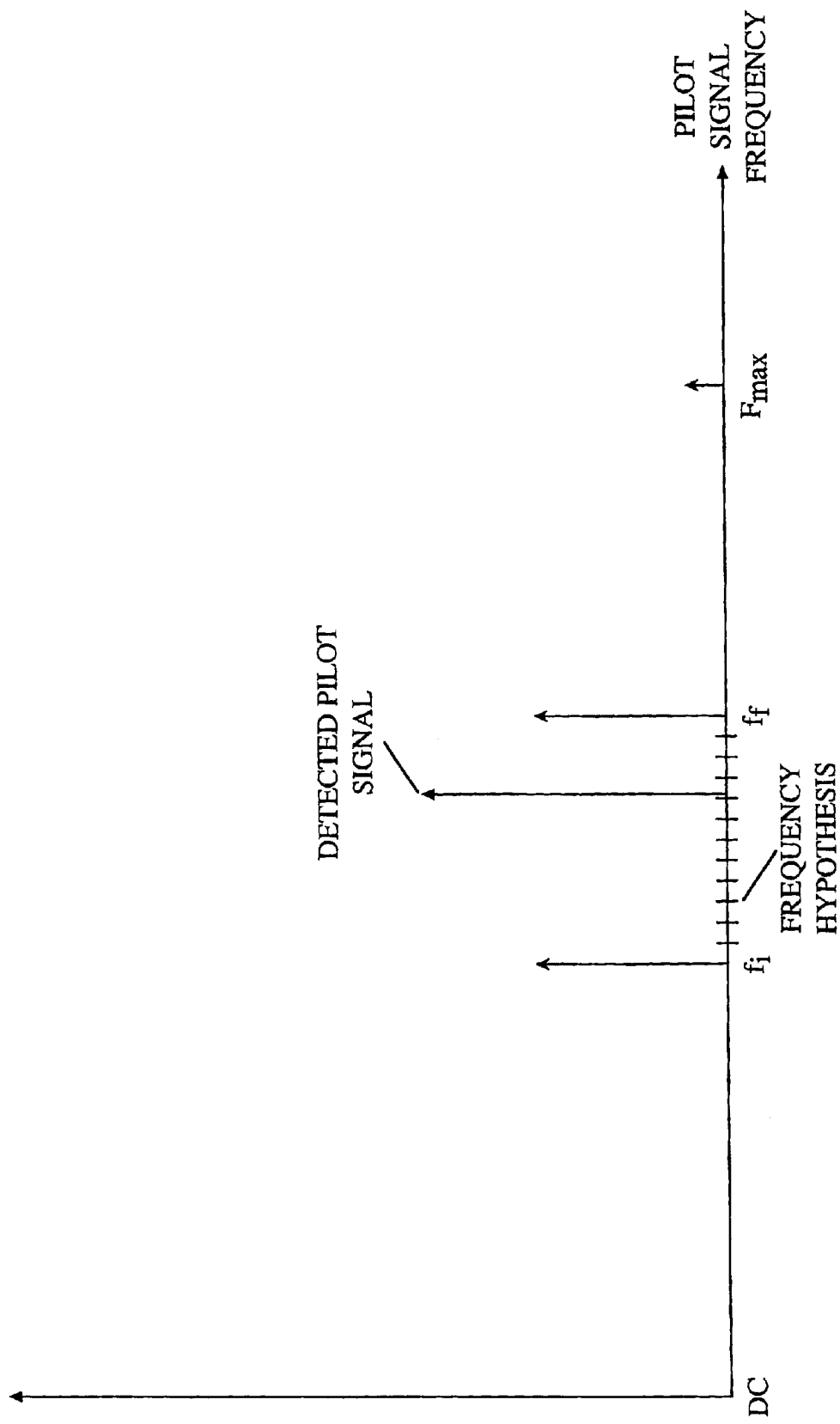
FIG. 4 depicts a frequency bin bounded by $f_i$ and $f_f$ which is known to contain the Doppler shifted pilot signal.

During detection, searcher receiver 218 determines whether or not the pilot signal is within a preselected frequency range, commonly referred to as a frequency bin, bounded by $f_i$ and $f_f$, as illustrated in FIG. 4. $F_{max}$ in FIG. 4 is the frequency of maximum possible Doppler shift that occurs when the system parameters are at their most extreme. That is, the frequency bin defined by $f_i$ and $f_f$ can slide between $-F_{max}$ and $+F_{max}$. Searcher receiver 218 determines where the boundaries of a frequency bin or search range are located, and the present invention determines which frequency hypothesis is closest to the center frequency of the detected pilot signal. Note that FIG. 4 represents the detected pilot signal as a discrete tone for illustration purposes only. In reality, the 3-dB bandwidth of a typical spread spectrum signal can be 500 kHz wide, which complicates the task of determining the center frequency.

In a step 306, the code Doppler error is estimated based on $f_f$ of FIG. 4. This estimate will be used to periodically adjust the timing of the PN generator in step 312, wherein the PN-generator is used to despread the pilot signal. In step 309, the frequency spectrum of the pilot signal is translated by the current frequency hypothesis. A frequency hypothesis is a discrete frequency within the FIG. 4 frequency bin. The term "hypothesis" is used because it is not known which one of the FIG. 4 frequencies is the closest to the center frequency of the pilot signal until all FIG. 4 frequencies have been processed. The value of the current frequency hypothesis is provided in step 327. In one embodiment, the initial frequency hypothesis is $f_i$ of FIG. 4, a lower frequency, and the frequency hypotheses are incremented from $f_i$ to $f_f$, an upper frequency. In an alternative embodiment, one could choose $f_f$ as the initial hypothesis, and decrement each hypothesis.

In another alternative embodiment, a bisection algorithm is applied in which the full frequency range between $f_i$ and $f_f$ is first divided in half and each half is tested for pilot energy. The winning half is then divided in half again and the process repeated. This implementation is faster than a sequential search when the number of subdivisions, bins, gets larger, say on the order of sixteen or more, but is slightly more complicated to implement.

The translated pilot signal is then despread in step 312 by multiplying the pilot signal by the proper PN sequence. In step 315, the despread signal samples are coherently accumulated over x-number of chips. In step 318, the energy is measured for the accumulated signal samples. In step 321, the energy measurements are accumulated over x-chips and 'm' of these coherent accumulations are used to produce an energy accumulation value (EAV) for the current frequency hypothesis. Therefore, an EAV consists of x times m chips of data.

The basic tradeoff in selecting x is that larger values are most efficient at collecting energy to make a good decision about whether an hypothesis is correct, but the size of x and the width of the frequency range being tested are inversely proportional. That is, the larger the value of x, the smaller the width of the frequency bin or range being tested. In order to avoid having very narrow bins and requiring a larger number of hypothesis to test, x is selected or adjusted to be a reasonable size. A value of x equal to 256 for the exemplary system being discussed provides the approximate frequency bandwidth desired, here about 3 kHz, in the subintervals being tested. If the value of x is doubled to 512, the tests would only be able to "see" pilots in a 1.5 kHz interval, and twice as many hypotheses would have to be tested to cover the total frequency range.

The larger the value used for m, the more energy that is accumulated, and the better each hypothesis can be tested. The size of m is limited by the fact that if it is made too large, hypothesis testing takes too long and possible Doppler error near the end of the testing will be excessive. A preferred value for m is 27 in the exemplary system discussed above, because that value is about as large as is desirable before incurring or running into excessive accumulation of Doppler error. Therefore, in an exemplary embodiment, the number of accumulated chips x is set at 256 and the number of accumulations used to generate EAV is set at 27.

In step 324, the EAV for the current frequency hypothesis is compared with a stored maximal EAV produced by the foregoing frequency hypotheses. If the stored maximal EAV is the larger, then nothing is changed, and the inventive process proceeds to step 327 where the frequency hypothesis is incremented. But, if the current frequency hypothesis EAV is greater than the prior maximal EAV, then the current frequency hypothesis EAV replaces the prior maximum EAV for comparison with EAVs produced by future frequency hypotheses. The initial stored maximal EAV value is selected to be, or set at, zero so that any subsequent measurement value used for comparison is automatically higher and becomes the stored value for subsequent hypothesis testing.

In step 327, the frequency hypothesis is incremented, and steps 309 through 324 are repeated for the new frequency hypothesis. The loop is repeated for each of the plurality of frequency hypotheses, where the frequency hypothesis with the largest EAV is the closest to the true center frequency of the detected signal.

Generally, the level of frequency discrimination that results is limited only by the number of frequency hypotheses tested between $f_i$ and $f_f$. However, when the pilot signal is a spread spectrum signal, there is tradeoff between the number of hypotheses tested and the accuracy of the energy accumulation value. In essence, code Doppler error causes a loss of time synchronization between the spread spectrum pilot signal and pseudonoise (PN) code sequence used to despread the pilot signal samples. The timing error increases with processing time (and thus the number of hypotheses tested), and if not corrected will lead to erroneous energy accumulation values for those frequency hypotheses in the latter part of the FIG. 4 frequency bin. In one embodiment, the number of hypotheses is chosen such that the frequency uncertainty of the detected pilot signal is reduced from 23 kHz to 3 kHz.

Figure 5:
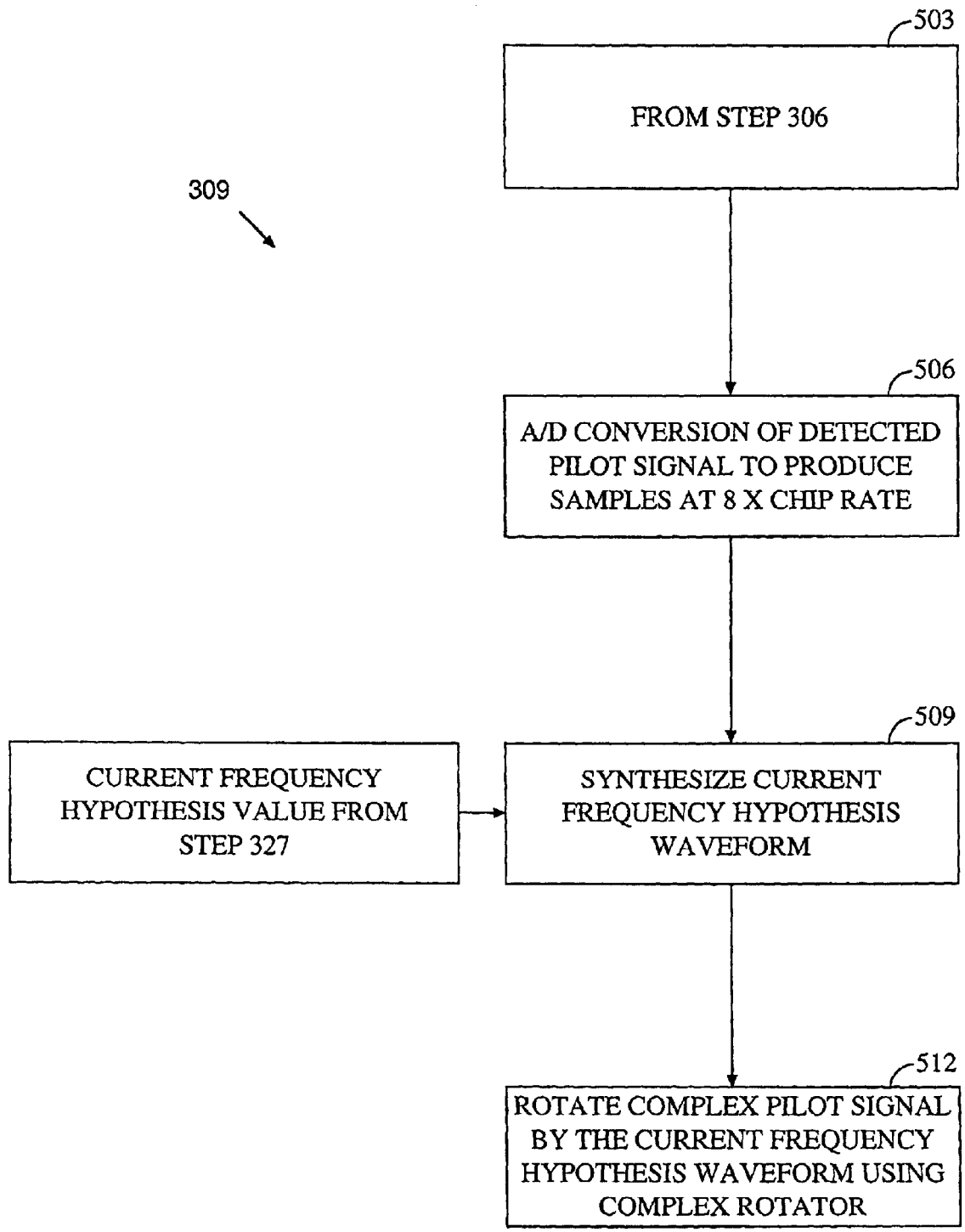
FIG. 5 is a flowchart depicting the frequency translation of the detected pilot signal.

FIG. 5 is an operational flow diagram illustrating one embodiment for implementing the present invention in step 309. In step 503, the detected pilot signal is received after the processing of from step 306. In step 506, the detected pilot signal is digitized by an analog-to-digital conversion to produce signal samples at eight times the chip rate (8×Chip). The current frequency hypothesis waveform is synthesized in step 509, based on the input from step 327. In step 512, the signal samples are rotated by the current frequency hypothesis waveform resulting in the translation of the pilot signal frequency spectrum. The translated pilot signal is then despread in step 306.

The closer the translated pilot signal's frequency spectrum is to DC, the more effective the despreading operation will be in compressing the spread pilot signal, which will ultimately produce relatively large energy accumulation values in step 321. FIG. 5 is but one embodiment of step 309. An alternative embodiment would be to translate the pilot signal prior to the analog-to-digital conversion via well known analog mixing techniques.

To test a hypothesis that a received signal is centered at $F_1$, that signal is translated by negative $F_1$ (this translation being accomplished in the RF/IF and digital rotator translations all combined) and then test to see if energy is detected at DC. To test a negative Doppler hypothesis, the digital rotator is used to translate the baseband signal by a positive frequency offset. A positive offset centers a baseband signal at DC if the Doppler shift is negative, and provides a good energy measurement. If the Doppler shift is not negative, the positive offset does not center the baseband signal at DC but moves it farther from being centered, resulting in a poor energy measurement. In a similar manner, a positive Doppler hypothesis is tested by using the digital rotator to translate the baseband signal by a negative frequency offset, to attempt to center the baseband signal. Therefore, circuits measuring energy are generally doing so at DC, with the rotator shifting different portions of the incoming signal spectrum into DC for these measurements.

Figure 6:
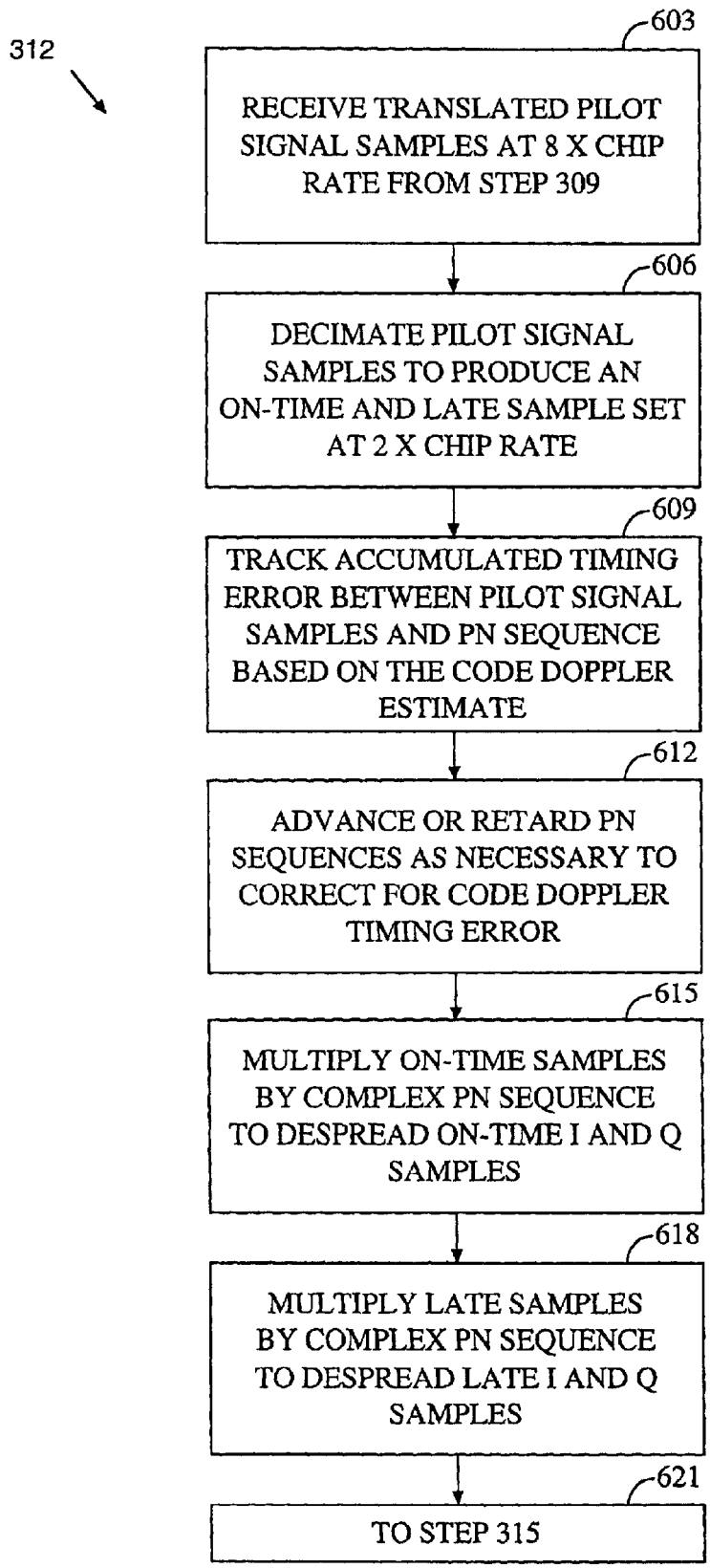
FIG. 6 is a flowchart depicting the despreading of the spread spectrum pilot signal.

FIG. 6 is an operational flow diagram illustrating one embodiment of step 312, where the pilot signal is despread. In step 603, the translated signal samples are received from step 309. As discussed in FIG. 5, in one embodiment, the pilot signal is sampled at eight times the chip rate (8×Chip) during the A/D conversion, although those skilled in the art will understand that other rates can be employed within the teachings of the invention for other applications. In step 606, the samples are decimated to produce two sets of samples at 2×Chip rate. For discussion purposes, one set is labeled "On-Time" and the other set labeled "Late". The Late samples are created by sampling the pilot signal ½ chip, or 4 clock pulses, later than the On-Time sample set. The Late sample set is generated to take advantage of the decision to base the code Doppler estimate on $f_f$, the final frequency hypothesis in the FIG. 4 frequency bin. As will be explained later, this results in lower code Doppler timing error over the plurality of frequency hypotheses compared to that produced when only one sample set is processed and the code Doppler error estimate is based on the middle of the FIG. 4 frequency bin.

In step 609, the invention monitors the code Doppler timing error that has accumulated between pilot signal samples and the PN sequence that despreads the pilot signal.

In step 612, the PN-sequence is advanced or retarded as necessary to correct the code Doppler timing error. In one embodiment, the timing of the PN-sequence is advanced or retarded in one-eighth chip increments, and the timing of the advance or retard is based on the code Doppler error estimate. In step 615, the On-Time samples are multiplied by a complex PN-sequence to create in-phase (I) and quadrature (Q) despread samples of the On-Time pilot signal. In step 618, the Late samples are multiplied by the complex PN-sequence to create I and Q despread samples of the Late pilot signal. In step 621, the On-Time I and Q samples and the Late I and Q samples are coherently accumulated over x-number of chips in step 315.

Figure 7:
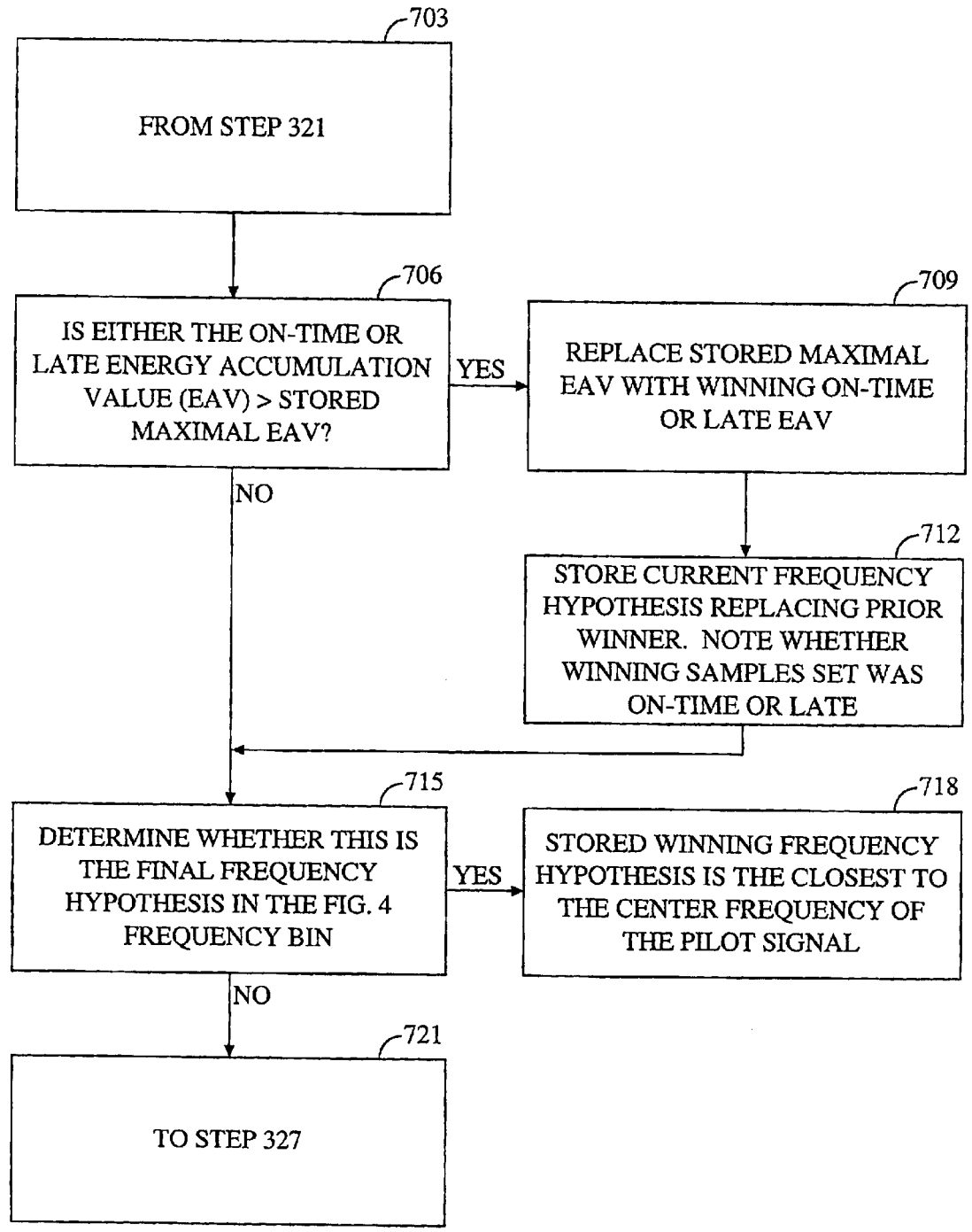
FIG. 7 is a flowchart depicting the comparison of the energy accumulation value of the current frequency hypothesis with the maximal energy accumulation value from the foregoing frequency hypotheses.

FIG. 7 is an operational flow diagram illustrating one embodiment of step 324, where the energy accumulation values (EAVs) for the current frequency hypothesis are compared with the maximal stored EAV from the plurality of foregoing frequency hypotheses. In step 703, the EAVs from the On-Time and Late sample sets for the current frequency hypothesis are received from step 321. In step 706, the On-Time and Late EAVs are compared to the maximal stored EAV from the plurality of foregoing frequency hypotheses. If the maximal EAV is the largest of the three, then processing proceeds to step 715. But if either the On-Time or the Late EAV is greater than the maximal stored EAV, then the method or process proceeds to steps 709 and 712. In step 709, the larger of the On-Time or Late EAVs replaces maximal stored EAV for comparison in future frequency hypotheses. In step 712, the current frequency hypothesis value and its On-Time/Late status is stored, replacing the preceding winning frequency hypothesis. In step 715, a determination is made as to whether or not the just processed frequency hypothesis is the last frequency hypothesis in the FIG. 4 frequency bin. If the answer is no, then the inventive process returns to step 327 to increment the frequency hypothesis value and repeat steps 309–324. If the answer is yes, then the currently stored winning frequency hypothesis is the closest hypothesis to the center frequency of the detected pilot signal as shown in step 718. The winning frequency hypothesis and its On-Time/Late status will be used during the demodulation of the message that follows the pilot signal.

IV. Code Doppler Error Correction

In one preferred embodiment, the invention implements two related refinements for correcting code Doppler error. The first is to estimate the code Doppler error based on $f_f$, the final frequency in the FIG. 4 frequency bin. This estimate is used to adjust the timing of the PN-generators to correct any accumulated timing error. The second technique is for the invention to process two sets of pilot signal samples in steps 312–324. One set of samples is labeled "On-Time", and one set is labeled "Late", where in one preferred embodiment, the Late sample set is generated by sampling the pilot signal one-half chip period, or 4 clock pulses when using 8× sampling, later in time relative to the On-Time samples. These refinements will be elaborated on below.

A. Code Doppler Error Estimate and PN-generator Timing Adjustment

Code Doppler error occurs whenever frequency Doppler is present and a digital data bit stream is being transmitted. In one example application discussed earlier, a 7 km/sec closing velocity between the transmitter and receiver will result in a Doppler ratio of 23 parts per million (or 23 ppm), and a 58 kHz Doppler frequency shift for a 2.5 GHz transmitter frequency. If the transmitter data rate is 1.0 Mbps, then code Doppler error will be 23 bps. That is, the received bit rate is 23 bps faster than the transmitted bit rate.

For effective de-spreading, it is desired to have less than one-half chip error between the detected signal and the PN sequence used to despread the signal. Thus, in this example, the receiver PN-generator should be set at a clock rate of 23 bps faster than the transmitter chip rate.

In the above discussion, the code Doppler error was easily rectified by simply increasing the clock rate of the PN-generator by 23 bps relative to the transmitter bit rate. This was based on a Doppler ratio of 23 ppm, which was calculated from the 58 kHz of known Doppler frequency shift. In the present invention, however, the amount of Doppler frequency shift is unknown. In fact, that is the purpose of the present invention, to find the center frequency of a detected pilot signal with a bounded, but unknown amount of Doppler frequency shift. Thus, in one embodiment, the code Doppler error is estimated in order to adjust the clock rate of the PN-generators that are used to despread the pilot signal in step 312 of present invention.

The code Doppler error estimate is calculated from equations (1)–(4), which are repeated here for convenience:

$$f_r = f_t \pm f_D \tag{1}$$

$$f_D = f_t [V/c] \tag{2}$$

$$r_r = r_t \pm r_D \tag{3}$$

$$r_D = r_t [V/c] \tag{4}$$

where
V=Velocity of transmitter relative to receiver
c=speed of light in the appropriate medium As discussed earlier, searcher receiver 218 determined the pilot signal is within a frequency bin bounded by $f_i$ and $f_f$ as shown in FIG. 4. For purposes of the code Doppler estimate only, the invention assumes the received pilot signal is at $f_f$. Using this assumption and Eq. 1 and Eq. 2, the Doppler ratio [V/c] can be calculated, since the transmitter frequency ($f_t$) is known. From the Doppler ratio, the code Doppler error ($r_D$) can be calculated from Eq. 4 since the transmitter chip rate ($r_t$) is known. The pilot signal chip rate ($r_p$), which is the same as $r_r$, can then be estimated using the relationship of Eq. 3, given a known transmitter chip rate ($r_t$), where the "+" is used if the $f_r$ is greater than $f_t$, and the "−" is used if $f_r$ is less than $f_t$. With an estimate of the pilot signal chip rate ($r_p$), one embodiment of the invention keeps track of the accumulated timing error between the pilot signal samples and the PN sequence in step 609, where the PN sequence is nominally generated at the transmitter chip rate. When the timing error reaches one-eighth of a chip, the invention advances or retards the PN generator timing to correct the accumulated timing error, as shown in step 612 of FIG. 6.

B. On-Time and Late Sample Sets

As discussed above, the code Doppler error estimate is based on $f_f$ for the frequency bin of FIG. 4. This is counter-intuitive since the most obvious frequency to base the code Doppler error estimate would be in the middle of the FIG. 4 frequency bin, assuming one wanted to have the best chance to minimize the difference between code Doppler estimated frequency and the unknown actual pilot signal frequency. However, it will be shown that an $f_f$ based code Doppler estimate and the processing of two sample sets in parallel results in a lower timing error over the plurality of frequency hypotheses compared to that achieved with a single sample set, where the code Doppler error estimate is based on the middle of the frequency bin. The basis of the code Doppler timing correction discussed in part 'A' above is the code Doppler error estimate. Since the estimate is based on the pilot signal being at $f_f$, timing error will still accumulate between the pilot signal and the PN generators, unless the pilot signal by chance happens to be centered at $f_f$. This timing error is best described by the relationship:

$$\text{Timing Error} = \int_{s}^{(T+k)} f_{err}(x)\,dx; \quad (5)$$

where $$f_{err}(x) = [\text{actual pilot signal chip rate}] - [PN \text{ generator chip rate}] \quad (6)$$

$$T_s = \text{time to process 1 frequency hypothesis} \quad (7)$$

$$= [\# \text{ of step 315 accumulations}] \cdot$$

$$[\# \text{ of step 321 accumulations}] \cdot T_C$$

$$T_c = \text{chip duration} \quad (8)$$

Figure 8:
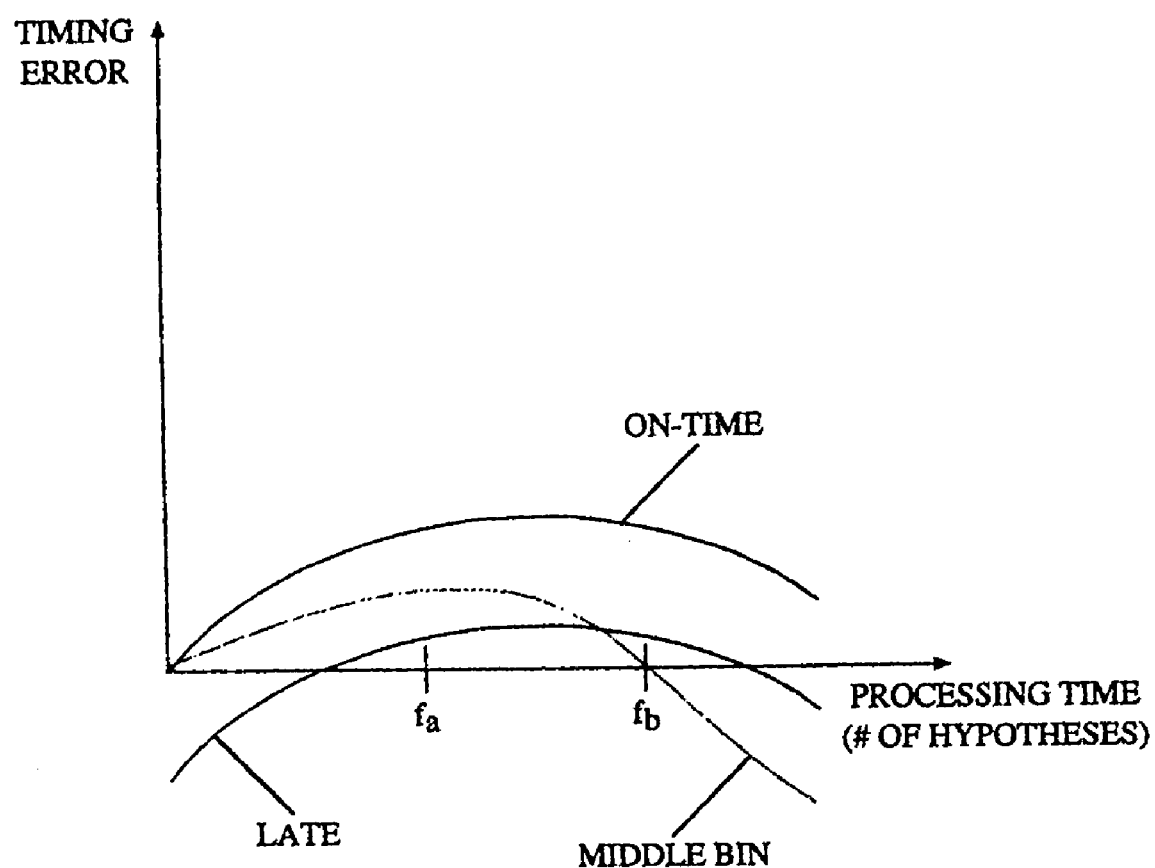
FIG. 8 is a plot of code Doppler timing error vs. processing time. The plot depicts two embodiments of the invention. The solid lines depict the preferred embodiment where two pilot signal sample sets are processed and the code Doppler error estimate is based on the final frequency $f_f$ of the FIG. 4 frequency bin. The dashed lines depict one sample set where the code Doppler estimate is based on the middle frequency of the FIG. 4 frequency bin.

FIG. 8 is a plot of Code Doppler timing error vs. invention processing time. The x-axis could also be labeled [number of frequency hypotheses] since the processing time increases with each additional frequency hypothesis. The total processing time is $T_s \cdot$ [number of frequency hypotheses]. The dashed line represents the timing error that occurs when the code Doppler estimate is based on the middle of the frequency bin, and only one pilot signal sample set is processed. The solid lines represent the timing error that occurs when the code Doppler estimate is based on $f_f$ of FIG. 4, and two pilot signal sample sets are processed in parallel. One sample set is On-Time and one sample set is Late, where in one embodiment the Late set is sampled one-half a chip period, or 4 clock pulses, later than the On-Time sample set.

When viewing FIG. 8, it must be remembered that the goal is to minimize the magnitude of the timing error over the plurality of frequency hypotheses. The On-Time and Late curves of FIG. 8 illustrate that using these hypotheses in tandem offers a lower magnitude of timing error than just the middle of the bin hypotheses, as shown by the Middle Bin curve. This is easily seen between hypotheses $f_a$ and $f_b$, where the Late curve offers a lower timing error than the Middle Bin curve. For the hypotheses less than $f_a$ and greater than $f_b$, where the Late curve timing error is approaching its maximum magnitude, the On-Time curve is approaching its minimum magnitude. Since the On-Time and Late sample sets are processed in parallel, only one of them at a particular frequency hypothesis needs to have a low timing error magnitude in order for the pilot signal to be successfully despread in step 315.

In summary, one preferred embodiment of the invention utilizes two related, but distinct, refinements to alleviate the effects of code Doppler error. The first refinement is to calculate a code Doppler error estimate based on $f_f$ of the FIG. 4 frequency bin. This estimate is used to advance or retard the PN-generators to correct timing error that accumulates during processing of the plurality of frequency hypotheses. The second refinement is for the invention to process two pilot signal sample sets in parallel instead of just one sample set. In one preferred embodiment, the Late sample set is delayed by one-half chip relative to the On-Time sample set. This, in conjunction with a code Doppler estimate based on the FIG. 4 final frequency ($f_f$), results in a lower overall timing error magnitude over the plurality of frequency hypotheses when compared with a scheme that processes only one pilot signal sample set.

In the above discussion, the Late sample set is delayed by ½ chip relative to the On-Time sample set. This is but one preferred embodiment. Other preferred embodiments may delay the Late sample set by some fraction of a chip other than ½ a chip period.

The above description is but one embodiment to reduce the effects of code Doppler error. An alternative embodiment would be to base the code Doppler estimate on the middle of the FIG. 4 frequency bin, and process three pilot signal sample sets in parallel. The three sample sets would comprise: an On-Time sample set; an Early sample set where the pilot signal is sampled a fraction of a chip before the On-Time sample set; and a Late sample set where said pilot signal is sampled a fraction of a chip after the On-Time sample set. Of course, this embodiment requires more hardware than processing only two sample sets, which might be disadvantageous in some situations.

V. Block Diagram of Invention

Figure 9:
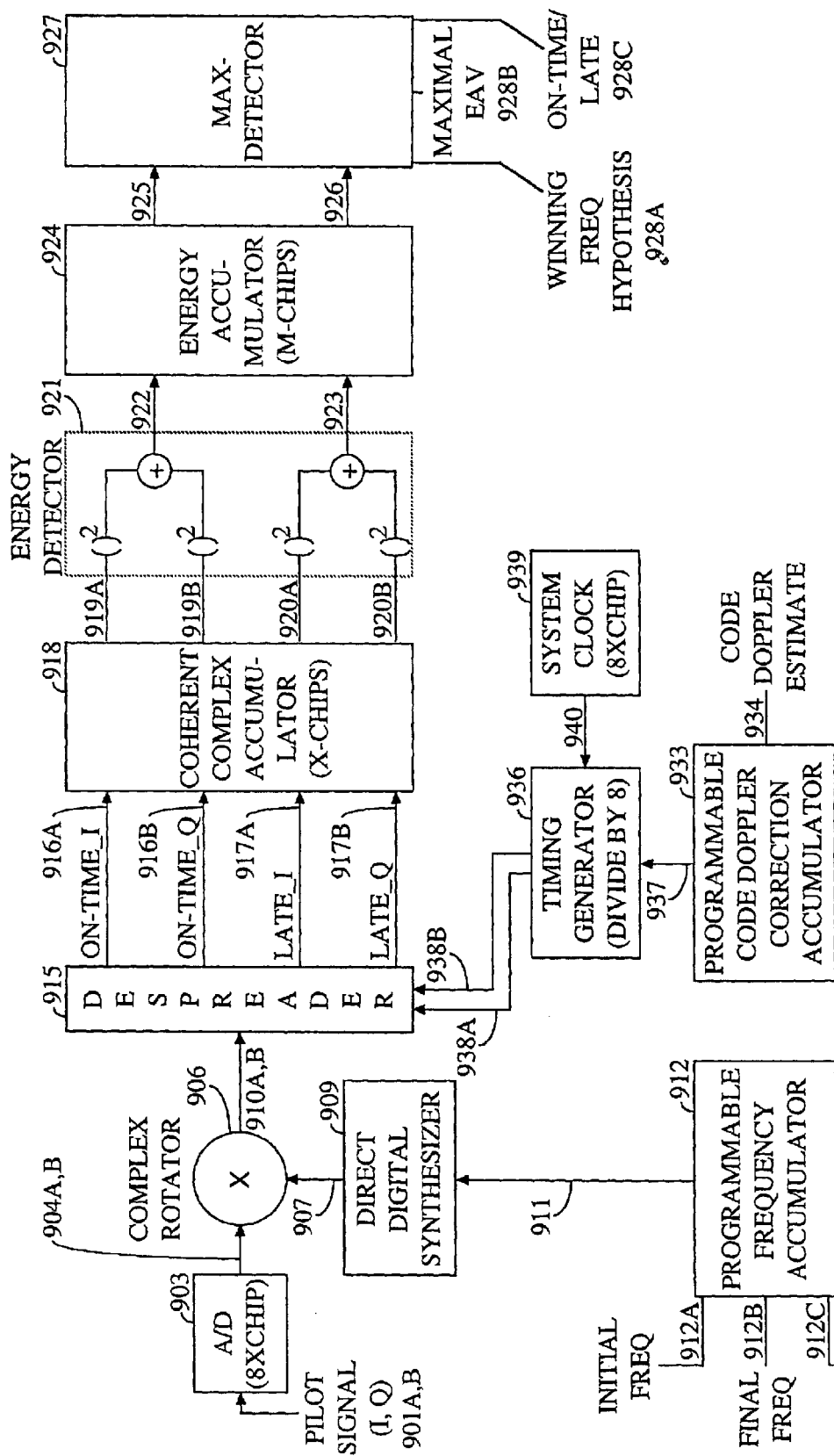
FIG. 9 is a block diagram depicting an example implementation of a preferred embodiment of the present invention.

FIG. 9 is a block diagram illustrating one example embodiment of the present invention. In this embodiment, the system includes: analog-to-digital converter 903, complex rotator 906, direct digital synthesizer 909, programmable frequency accumulator 912, signal despreader 915, coherent complex accumulator 918, energy detector 921, energy accumulator 924, energy max-detector 927, code Doppler correction accumulator 933, system clock 936, and timing generator 939.

A pilot signal 901 with an unknown amount of Doppler shift is detected by searcher receiver 218 and submitted for processing. The searcher receiver 218 determines that the pilot signal 901 is within a frequency bin bounded by $f_i$ and $f_f$ as shown in FIG. 4. In one embodiment, pilot signal 901 is a complex spread spectrum signal with both in-phase (I) 901a and quadrature (Q) 901b components. The pilot signal 901 has been downconverted from the appropriate RF transmission band by analog receiver 214, but its frequency spectrum is not centered at DC because of the unknown amount of Doppler shift.

The pilot signal 901 is digitized by analog-to-digital(A/D) converter 903, where in one embodiment samples are produced at eight times the chip rate (8×Chip or 8× oversampling). (It is typical for those skilled in the art to refer to a spread signal digital bit as a "chip". The PN code or spreading bits output by the PN generator are also referred to as "chips".) A complex rotator 906 then translates the frequency spectrum of pilot signal 901 by the current frequency hypothesis 907. The current hypothesis is synthesized by a direct digital synthesizer (DDS) 909 to produce translated pilot signal 910. Translated pilot signal 910 is complex with I and Q components 910a,b. The programmable frequency accumulator 912 supplies DDS 909 with the current frequency hypothesis value 911. The frequency accumulator 912 increments current hypothesis value 911 over the plurality of hypotheses to be tested. This is determined by the programmed inputs of initial frequency 912a, final frequency 912b, and number of hypotheses 912c. The initial frequency and final frequency correspond to $f_i$ and $f_f$ of the FIG. 4 frequency bin. The use of complex rotator 906 to translate the pilot signal's spectrum 901 after A/D conversion is but one embodiment. An alternative embodiment would be to translate the pilot signal 901 prior to A/D conversion using well known analog mixing techniques.

Spread pilot signal 910 is despread in despreader 915 by combining, such as through multiplying, signal 910 by the proper PN code sequences. In one embodiment, the in-phase (I) pilot signal component 901a is spread with a PN sequence during transmission that is statistically independent from that used to spread quadrature(Q) component 901b. This embodiment offers an additional level of isolation between user terminals that share the same frequency channel, but have distinct PN codes. In order to despread pilot signal 910, the 915 despreader multiplies or otherwise combines I and Q components 910a,b by, or with, the identical respective PN sequences that were used to spread the components during transmission.

In one preferred embodiment of the despreader 915, the pilot signal I and Q components 910a,b are decimated from eight times the chip rate (8×Chip) to 2×Chip rate to produce two sets of samples for each I 910a and Q 910b component. One sample set is labeled "On-Time" and one sample set is labeled "Late", where the Late set is sampled one-half chip, or 4 clock pulses later than the "On-Time" sample set. Thus, the despreader 915 produces four sample sets, namely: On-Time I component 916a; On-Time Q component 916b; Late I component 917a; and Late Q component 917b. The processing of two sample sets in parallel results in a lower timing error over the plurality of frequency hypotheses compared to processing only one sample set. Also, the code Doppler estimate 933a is used by the code Doppler correction accumulator (CDCA) 933 to periodically adjust the timing phase between the despreader 915 PN generators and the pilot signal 910.

Figure 10:
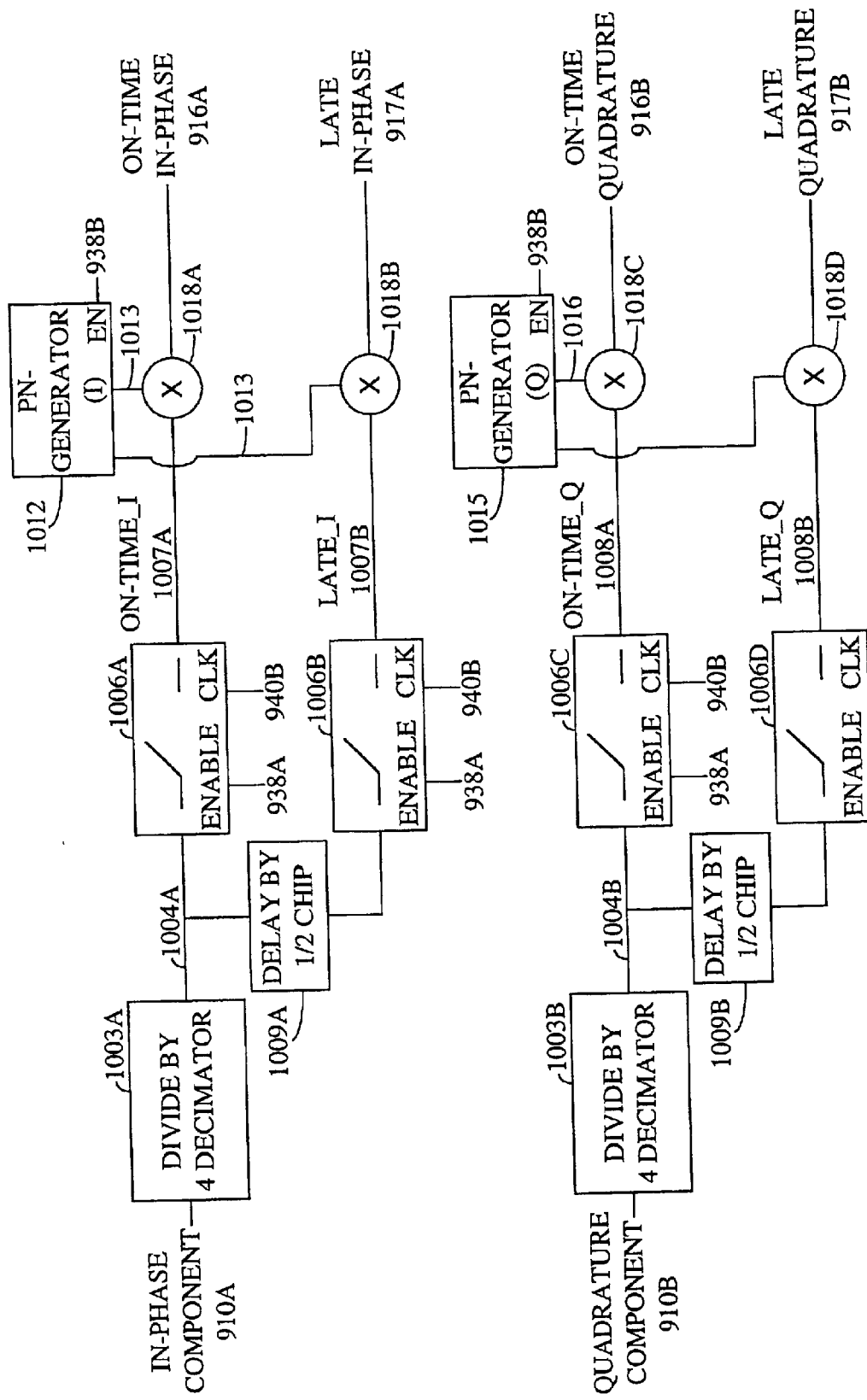
FIG. 10 is a block diagram depicting an example implementation of a preferred embodiment of despreader 915 depicted in FIG. 9.

FIG. 10 illustrates one preferred embodiment of despreader 915 which includes: divide-by-4 decimators 1003a,b; samplers 1006a,b,c,d; delay elements 1009a,b; in-phase PN-generator 1012; quadrature PN generator 1015, and multipliers 1018a,b,c,d. Pilot signal I and Q components 910a,b are decimated by the divide-by-4 decimators 1003a,b to produce I and Q signals 1004a,b at 2×Chip rate. I component 1004a is sampled by samplers 1006a,b to produce signals 1007a,b where the 1007a signal is labeled "On-Time" and the 1007b signal is labeled "Late", where Late signal 1007b is sampled after delay element 1009a. In one embodiment, delay element 1009a delays Late I component 1007b by one-half chip period, or 4 clock pulses, relative to the On-Time I component 1007a. I component signals 1007a,b are multiplied by PN-sequence 1013 generated by in-phase PN generator 1012 to produce On-Time and Late in-phase despread signals 916a, 917a. The Q component 1004b is processed similarly by: samplers 1006c,d; delay element 1009b; and quadrature PN-generator 1015; where the only difference is that the PN-sequence produced by the quadrature PN generator 1015 is statistically independent from that generated by in-phase PN generator 1012. Thus, despreader 915 produces four sample sets, namely: On-Time I component 916a; On-Time Q component 916b; Late I component 917a; and Late Q component 917b.

The On-Time I and Q components 916a,b and Late I and Q components 917a,b are coherently accumulated over x-chips by the complex accumulator 918 to produce On-Time I and Q accumulated components 919a,b and Late I and Q accumulated components 920a,b. Digital accumulators are well known by those skilled in the art. In one embodiment, the coherent accumulation is done over 256 chips, but other periods can be used. Longer accumulation periods produce a higher signal-to-noise ratio, but also allow code Doppler error effects to build up. These effects can reduce the effectiveness of PN sequence despreading in subsequent frequency hypotheses processing.

Energy Detector 921 measures the energy of On-Time components 919a,b and Late components 920a,b. The On-Time signal energy is measured by adding the squares of the I and Q components 919a,b to produce On-Time energy samples 922. Similarly, the Late signal energy is measured by adding the squares of the Late I and Q components 920a,b to produce Late energy samples 923. Energy accumulator 924 accumulates m energy measurements over a period of m times x-chips (x-chips per coherent accumulation times m accumulations) to produce an On-Time energy accumulation value (EAV) 925 and a Late energy accumulation value (EAV) 926.

EAVs 925 and 926 are then sent to an energy max-detector 927 where they are compared with a maximal stored EAV 928b from the plurality of foregoing frequency hypotheses. If maximal stored EAV 928b is the largest of the three, then nothing is changed and the frequency accumulator 912 immediately increments frequency hypothesis value 911. But if either of On-Time or Late EAVs 925, 926 is greater than maximal stored EAV 928b, then the larger of On-Time or Late EAVs 925, 926 replaces maximal stored EAV 928b for future frequency hypothesis comparisons. Also, current frequency hypothesis value 911 is stored as winning frequency hypothesis 928a replacing the previous winning frequency hypothesis. The On-Time/Late status 928c of the winning EAV is also noted and stored.

After the current EAV comparison is complete, programmable frequency accumulator 912 increments frequency hypothesis value 911 and the loop is repeated for the new frequency hypothesis. The loop is repeated over the plurality of frequency hypotheses between $f_i$ and $f_f$, and the winning frequency hypothesis 928a that is stored after all hypotheses are tested is the closest to the center frequency of the Doppler shifted pilot signal 901. Winning frequency hypothesis 928a and its On-Time/Late status 928b are sent to digital data receivers 216A–N for use in demodulation of signals, such as traffic channel or message signals.

The number of frequency hypotheses tested is controlled by the initial programming of frequency accumulator 912 through input 912c. Obviously, the more hypotheses that are tested, the closer winning frequency hypothesis 928a is to the pilot signal's true center frequency. However, because of code Doppler error effects, there is a tradeoff between the number of hypotheses tested and the ability to accurately despread pilot signal 910. In one embodiment, the number of frequency hypotheses is chosen so that the invention narrows the frequency uncertainty from 23 kHz to 3 kHz.

The programmable code Doppler correction accumulator (CDCA) 933 monitors the accumulated timing error between the pilot signal 910 samples and PN sequences 1013, 1016 that has built up because of code Doppler error. In one embodiment, when the timing error has reached ⅛ chip in size, the CDCA 933 issues an "advance" or "retard" signal 937 to the timing generator 936 to correct the accumulated timing error.

Figure 11:
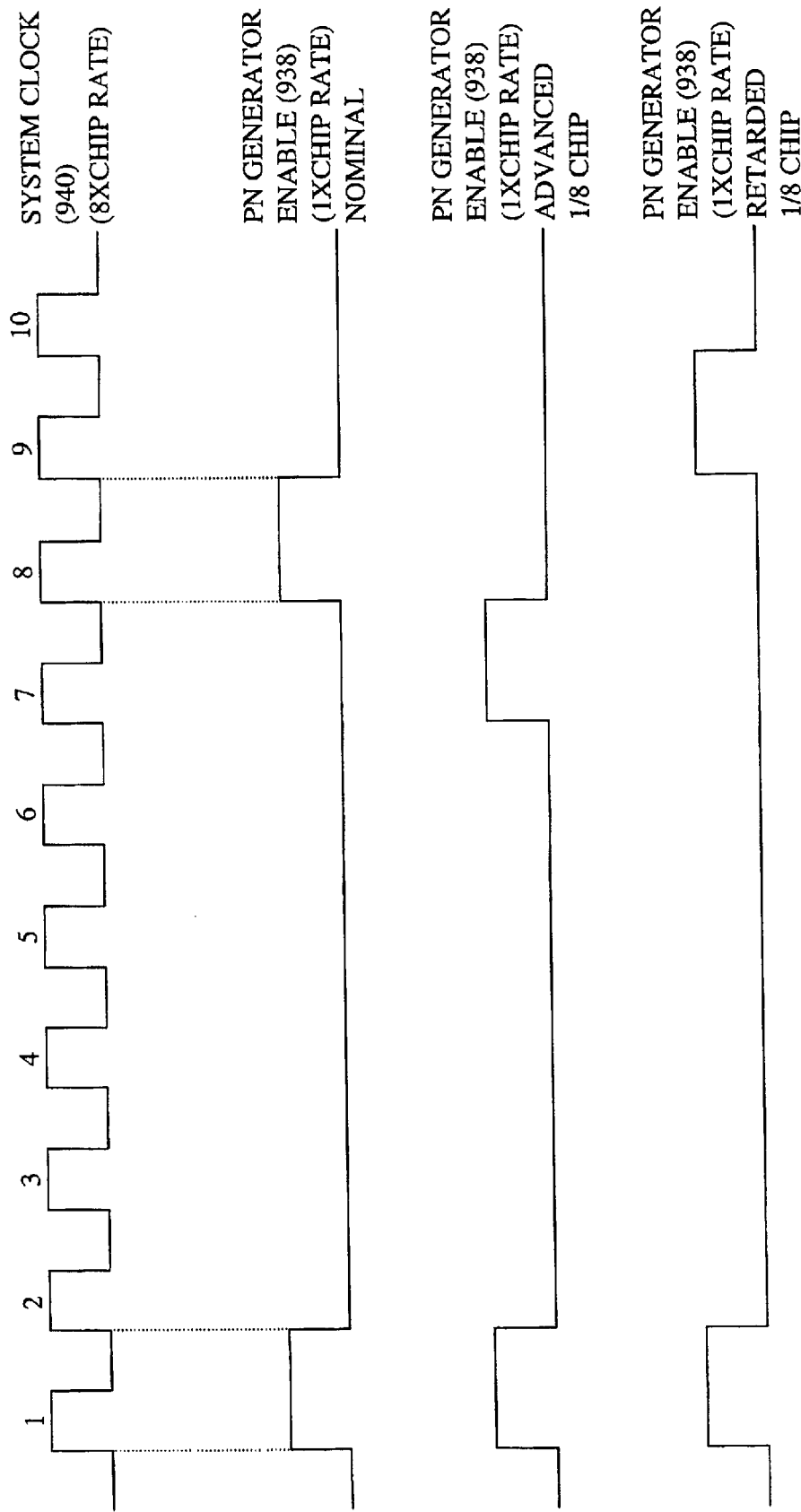
FIG. 11 is a timing diagram depicting the PN generator enable signal 938b sent by timing generator 936 as controlled by the code Doppler Correction accumulator 933.

FIGS. 9, 10, and 11 illustrate one embodiment of the code Doppler correction implemented by CDCA 933. System clock 939 generates clock signal 940 at an 8×Chip rate as shown by FIG. 11. Timing generator 936 is a divide-by-8 circuit that receives clock signal 940 and provides enable signals 938a,b, nominally at a 1×Chip rate to despreader 915, as shown in FIG. 11. Signal 938a enables samplers 1006a,b,c,d and signal 938b enables PN generators 1012, 1015. This results in in-phase signals 1007a,b and quadrature signals 1008a,b being despread using multipliers 1018a,b,c,d and the codes output from PN generators 1012 and 1015.

CDCA 933 is a programmable accumulator that calculates and monitors the accumulated timing error over the plurality of frequency hypotheses based on the code Doppler error estimate 934. When the accumulated timing error reaches one-eighth chip, CDCA 933 issues an "advance" or "retard" signal 937 to timing generator 936. The advance/retard signal 937 causes the timing generator to send the PN generator enable signal 938*b* one-eighth chip earlier or later than nominal, depending on what is desired to correct accumulated timing error between pilot signals 910*a,b* and PN sequences 1013, 1016. As discussed above, the frequency that CDCA 933 issues the advance/retard signal at is dependent upon code Doppler estimate 934.

For example, if the chip rate in the transmission signal is on the order of $1.2288 \times 10^6$ chips per second, and there is a code Doppler estimate (error) of 40 ppm, then accumulated Doppler error in 1 second is $(^{40}/10^6) \cdot 1.2288 \times 10^6$ chips per second or about 49.152 chips/sec. When 8× sampling is used the number of advance or retard increments/decrements per second is determined by how many ⅛ chips occur per second. Therefore, an accumulated error of 49.152 chips/sec is 393.216 (⅛ chips)/sec and requires this many advance or retard signals per second to be issued during the plurality of frequency hypotheses testing to correct. Those skilled in the art will understand how to determine the number of advances and retard signals or increment/decrement commands that are appropriate for a given chip rate and sampling frequency, as well as the use of non-fractional values.

VI. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claims as our invention is:

1. Apparatus for narrowing the range of frequency uncertainty of a detected pilot signal comprising:

an accumulator configured to coherently accumulate samples of detected pilot signals over a plurality of chips for each of a plurality of frequency hypothesis;

an energy detector coupled to the accumulator and configured to measure energy of the accumulated pilot signal samples;

an energy accumulator coupled to the energy detector and configured to accumulate a plurality of energy measurements from the energy detector to produce an energy accumulation value (EAV);

a max-detector coupled to the energy accumulator and configured to determine which of a plurality of frequency hypotheses results in a highest EAV.

2. The apparatus of claim 1, further comprising:

a despreader configured to despread the detected pilot signals into at least two sample sets of pilot signals and providing the sample sets to the accumulator, wherein the accumulator coherently accumulates the at least two sample sets, wherein the energy detector measures the energy of the accumulated pilot signal samples of the two sample sets, and wherein the energy accumulator accumulates a plurality of energy measurements to produce an EAV for each of the two sample sets.

3. Apparatus for narrowing the range of frequency uncertainty of a detected pilot signal comprising:

an accumulator configured to coherently accumulate samples of detected pilot signals over a plurality of chips for each of a plurality of frequency hypothesis;

an energy detector coupled to the accumulator and configured to measure energy of the accumulated pilot signal samples;

an energy accumulator coupled to the energy detector and configured to accumulate a plurality of energy measurements from the energy detector to produce an energy accumulation value (EAV);

a max-detector coupled to the energy accumulator and configured to determine which of a plurality of frequency hypotheses results in a highest EAV;

a despreader configured to despread the detected pilot signals into at least two sample sets of pilot signals and providing the sample sets to the accumulator, wherein the accumulator coherently accumulates the at least two sample sets, wherein the energy detector measures the energy of the accumulated pilot signal samples of the two sample sets, and wherein the energy accumulator accumulates a plurality of energy measurements to produce an EAV for each of the two sample sets;

wherein the despreader comprises:

a decimator configured to decimate the detected pilot signal and produce a first sample set; and a delay element coupled to the decimator and configured to delay the first sample set of pilot signals and produce a second sample set of pilot signals.

4. The apparatus of claim 1, further comprising:

a despreader configured to despread the detected pilot signals by combining the detected pilot signal with proper PN code sequences before coherently accumulating samples of pilot signals;

a code Doppler correction accumulator configured to periodically adjust the timing phase between the proper PN code sequences and the detected pilot signals.

5. The apparatus of claim 4, further comprising:

a timing generator coupled to the despreader and the code Doppler correction accumulator, the timing generator configured to send the proper PN code sequences earlier or later than nominal based upon a signal from the code Doppler correction accumulator.

6. The apparatus of claim 1, further comprising:

a complex rotator configured to shift frequency spectrum of the detected pilot signal by a current frequency hypothesis; and a despreader configured to despread the detected pilot signals with shifted frequency spectrum before coherently accumulating samples of pilot signals.

7. The apparatus of claim 6, further comprising:

a synthesizer configured to synthesize the current frequency hypothesis using a current frequency hypothesis value; and a frequency accumulator configured to supply the synthesizer with the current frequency hypothesis value.

8. Apparatus for a spread spectrum communication system, comprising:

searcher receiver configured to detect a pilot signal within a frequency bin bounded by an upper frequency;

a despreader configured to despread the detected pilot signal;

an accumulator configured to coherently accumulate samples of despreaded pilot signals over a plurality of chips for each of a plurality of frequency hypothesis;

an energy detector coupled to the accumulator and configured to measure energy of the accumulated pilot signal samples;

an energy accumulator coupled to the energy detector and configured to accumulate a plurality of energy measurements from the energy detector to produce an energy accumulation value (EAV);

a max-detector coupled to the energy accumulator and configured to determine which of the plurality of frequency hypotheses results in a highest EAV.

9. Apparatus for a spread spectrum communication system, comprising:

searcher receiver configured to detect a pilot signal within a frequency bin bounded by an upper frequency;

a despreader configured to despread the detected pilot signal;

an accumulator configured to coherently accumulate samples of despreaded pilot signals over a plurality of chips for each of a plurality of frequency hypothesis;

an energy detector coupled to the accumulator and configured to measure energy of the accumulated pilot signal samples;

an energy accumulator coupled to the energy detector and configured to accumulate a plurality of energy measurements from the energy detector to produce an energy accumulation value (EAV);

a max-detector coupled to the energy accumulator and configured to determine which of the plurality of frequency hypotheses results in a highest EAV;

wherein the despreader comprises:
 a decimator configured to decimate the detected pilot signal and produce one sample set of pilot signals; and
 a delay element coupled to the decimator and configured to delay the first sample set and produce a second sample set of pilot signals; and wherein the accumulator coherently accumulates the at least two sample sets, wherein the energy detector measures the energy of the accumulated pilot signal samples of the two sample sets, and wherein the energy accumulator accumulates a plurality of energy measurements to produce an EAV for each of the two sample sets.

10. The apparatus of claim 8, wherein the despreader despreads the detected pilot signals by combining the detected pilot signal with proper PN code sequences, and wherein the apparatus further comprises:

a code Doppler correction accumulator configured to periodically adjust the timing phase between the proper PN code sequences and the detected pilot signals.

11. The apparatus of claim 10, further comprising:

a timing generator coupled to the despreader and the code Doppler correction accumulator, the timing generator configured to send the proper PN code sequences earlier or later than nominal based upon a signal from the code Doppler correction accumulator.

12. The apparatus of claim 10, wherein the searcher receiver detects the pilot signal within a frequency bin bounded by a lower frequency and an upper frequency, and wherein the code Doppler correction accumulator adjust the timing phase based on a code Doppler error estimate, the apparatus further comprising:

means for estimating the code Doppler error based on a frequency within the frequency bin.

13. Apparatus for a spread spectrum communication system, comprising:

searcher receiver configured to detect a pilot signal within a frequency bin bounded by an upper frequency;

a despreader configured to despread the detected pilot signal;

an accumulator configured to coherently accumulate samples of despread pilot signals over a plurality of chips for each of a plurality of frequency hypothesis;

an energy detector coupled to the accumulator and configured to measure energy of the accumulated pilot signal samples;

an energy accumulator coupled to the energy detector and configured to accumulate a plurality of energy measurements from the energy detector to produce an energy accumulation value (EAV);

a max-detector coupled to the energy accumulator and configured to determine which of the plurality of frequency hypotheses results in a highest EAV;

said despreader being further configured to despread the detected pilot signals by combining the detected pilot signal with proper PN code sequences and further comprising a code Doppler correction accumulator configured to periodically adjust the timing phase between the proper PN code sequences and the detected pilot signals;

wherein the searcher receiver detects the pilot signal within a frequency bin bounded by a lower frequency and an upper frequency, and wherein the code Doppler correction accumulator adjusts the timing phase based on a code Doppler error estimate;

further comprising means for estimating the code Doppler error based on a frequency within the frequency bin; and wherein the means for estimating the code Doppler error comprises:
 means for determining Doppler ratio based on the upper frequency and transmitter chip rate; and
 means for determining the code Doppler error based on the Doppler ratio and receiver bit rate.

14. The apparatus of claim 8, further comprising:

a complex rotator configured to shift frequency spectrum of the detected pilot signal by a current frequency hypothesis before despreading the detected pilot signals.

15. The apparatus of claim 14, further comprising:

a synthesizer configured to synthesize the current frequency hypothesis using a current frequency hypothesis value; and a frequency accumulator configured to supply the synthesizer with the current frequency hypothesis value.

16. The apparatus of claim 15, wherein the current frequency hypothesis value is the frequency hypothesis corresponding to the highest EAV.

17. The apparatus of claim 8, further comprising:

a storage configured to store a maximal EAV; and wherein the max-detector compares the EAV from the energy accumulator to the maximal EAV to determine which of the plurality of frequency hypotheses results in the highest EAV.

18. The apparatus of claim 8, further comprising:

a digital data receiver configured to demodulate signals based on a frequency hypothesis corresponding to the highest EAV.

19. The apparatus of claim 8, further comprising:

an analog-to-digital converter configured to digitize the detected pilot signal and producing samples of detected pilot signals at eight times the chip rate of the pilot signal.

\* \* \* \* \*